April 9, 1935.  J. OLSON  1,997,428

CLAMPING DEVICE

Filed April 12, 1933   2 Sheets-Sheet 1

INVENTOR.
John Olson
BY George B. Ingersoll.
ATTORNEY.

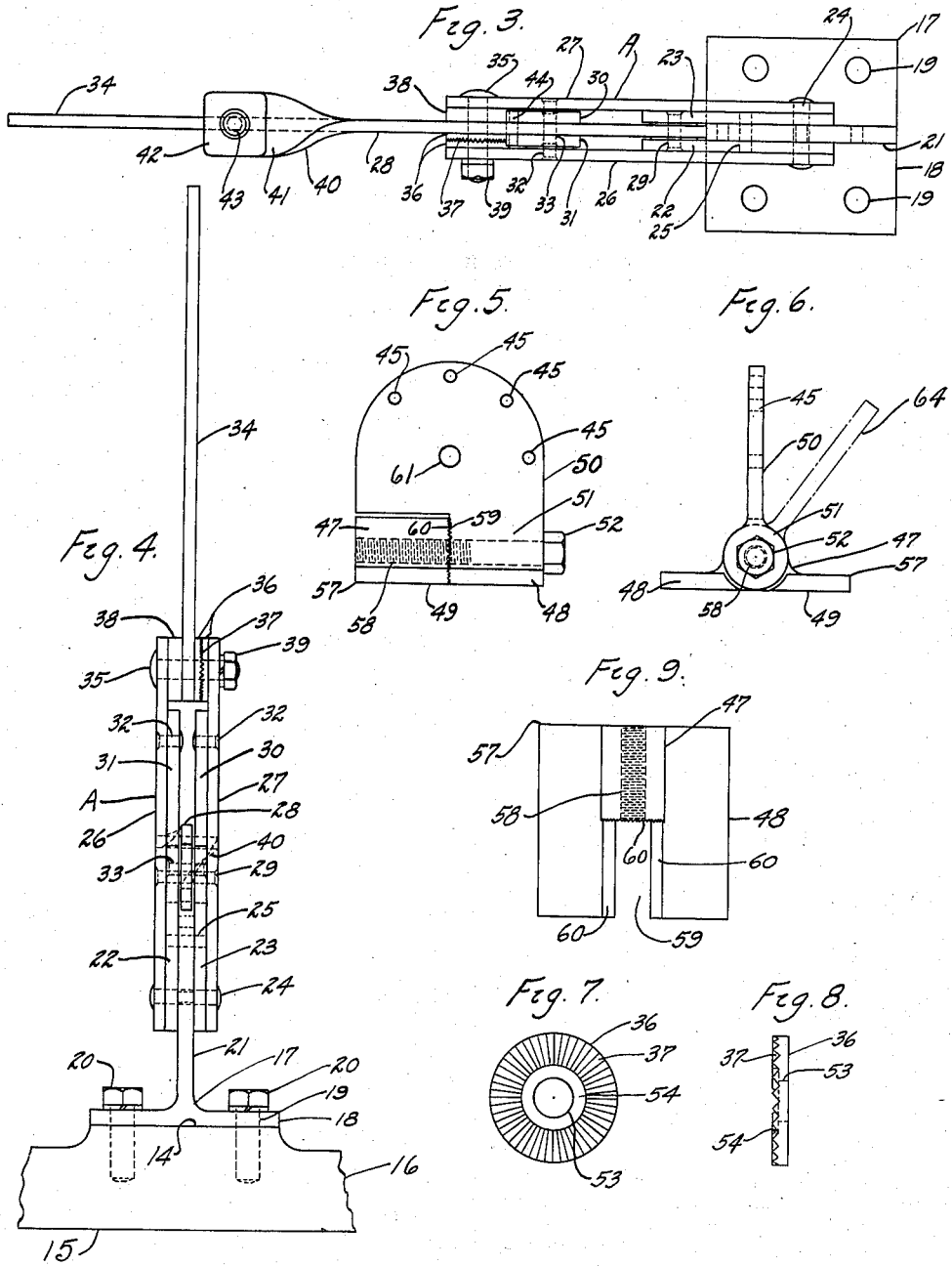

Patented Apr. 9, 1935

1,997,428

UNITED STATES PATENT OFFICE 1,997,428

CLAMPING DEVICE

John Olson, Detroit, Mich.

Application April 12, 1933, Serial No. 665,763

9 Claims. (Cl. 153—25)

My invention relates to improvements in a clamping device for use in clamping objects in die or similar members and the objects of my improvement are, first, to provide a clamping device with adjustment means to permit the device to operate in various clamping positions; second, to provide a clamping device with a plurality of adjustment means; third, to provide a clamping device pivotally mounted on a base means; fourth, to provide a clamping device having a clamping means adjustably mounted in a single plane together with means to permit the clamping device to be adjustably moved in a plane extending at an angle with said first mentioned plane in which the clamping means is adjustably mounted; fifth, to provide a clamping device provided with an adjustably mounted handle member; sixth, to provide an adjustably mounted clamping device with an increasing leverage mechanism; and seventh, to provide a handle adjusting means employing coacting serrated members.

I attain these objects by mechanism illustrated in the accompanying drawings, in which—

Figure 2:
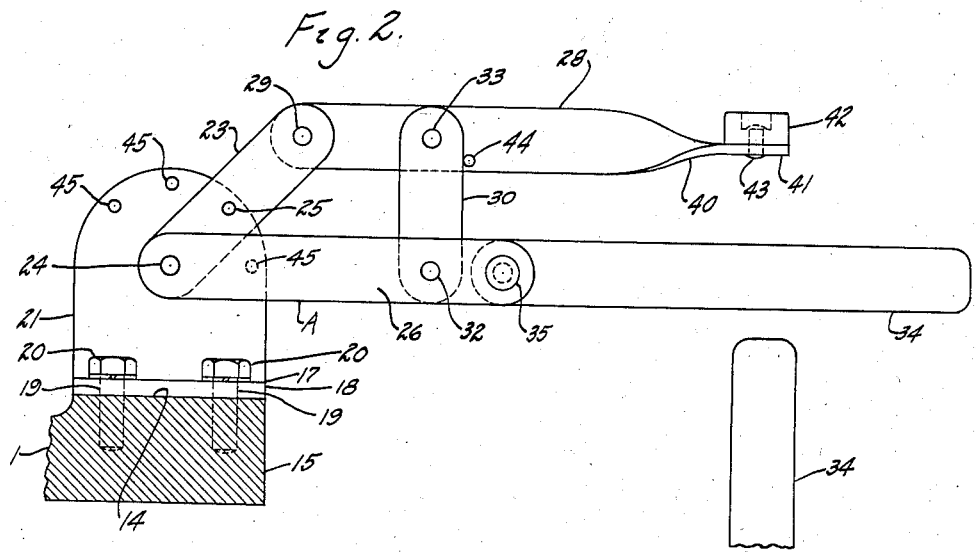
Figure 1:
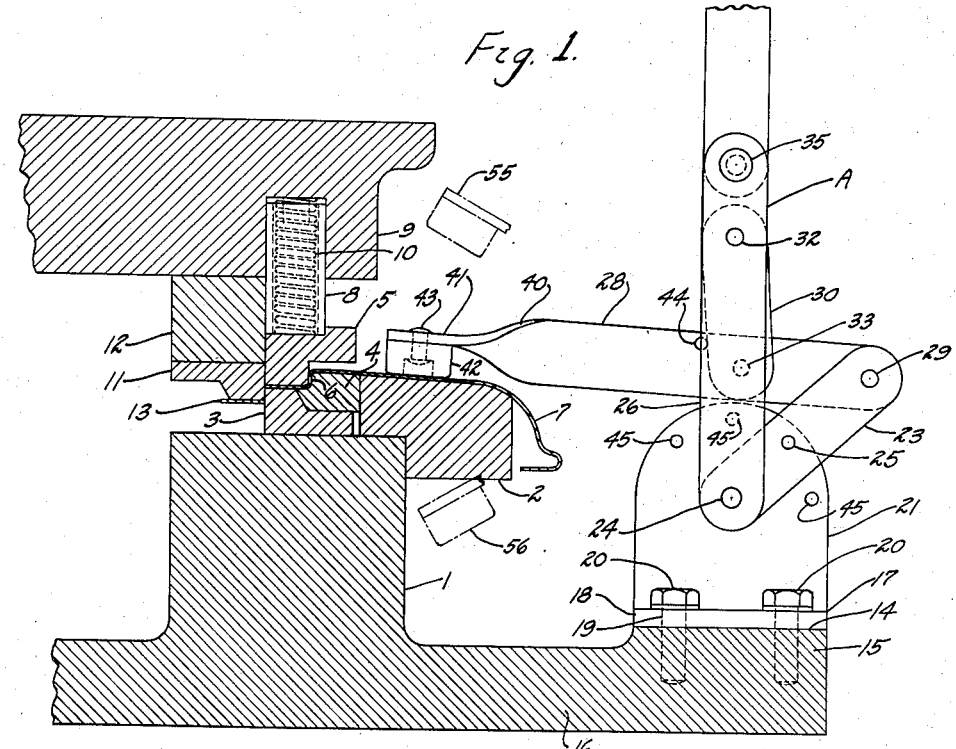

Figure 1 is a side view of the clamping device installed in conjunction with die members; Fig. 2, a side view of the clamping device in its disengaged or opened position; Fig. 3, a plan view of the clamping device in a position corresponding to its open position as disclosed in Fig. 2; Fig. 4, an end view of the clamping device in a position corresponding to a clamping position; Fig. 5, a side view of the adjustable base mechanism provided with a pair of pivotally connected members; Fig. 6, an end view of the adjustable base mechanism disclosed in Fig. 5; Fig. 7, a side view of one of the adjusting washers; Fig. 8, a side view of one of the adjusting washers; and Fig. 9, a plan view of the lower supporting member of the adjustable base mechanism as disclosed in Figs. 5 and 6.

Similar numerals refer to similar parts throughout the several views.

The clamping device assembly A is disclosed in Fig. 1 as being mounted on the lower die member 1, on which is suitably supported the die member 2. The die member 2 is suitably provided with the die portions 3 and 4, which together with the upper die portion 5, are adapted to form the flange portion 6 of the pressed steel member 7. The die portion 5 performs the function of a stripping member as conventionally used in die members, the die portion 5 being suitably supported on the plunger member 8 which is slidably mounted in the upper die member 9, the plunger member 8 being resiliently actuated by the spring 10 to cause the plunger member 8 and the die member 5 to exert a stripping thrust load against the pressed steel member 7 when the upper member 9 is raised to release and permit the removal of the pressed steel member 7 from the die members. The die portion 11 is suitably connected by the member 12 to the upper die member 9 so that its cutting edge, in conjunction with the die portion 3, will shear or trim the portion 13 from the flange portion of the pressed steel member 7.

In order to clamp the pressed steel member 7 in the various die portions and maintain same during the flanging and shearing operations, and to prevent the pressed steel member 7 from drawing and becoming displaced in the operations, the clamping device assembly A is suitably mounted as hereinafter disclosed on the surface 14 of the boss 15 of the extension 16 of the die member 1.

The clamping device assembly A is provided with the base member 17 which is provided with the horizontal flange 18, which in turn is provided with the holes 19, through which extends the screws 20 for clamping the base member 17 to the surface 14. The base member 17 is provided with the upright flange 21.

The members 22 and 23 are secured to the flange member 21 by the pins 24 and 25, the members 22 and 23 thus being held from movement and the members 26 and 27 are pivotally mounted on the pin member 24. Also the clamping member or arm 28 is pivotably mounted on the pin 29 which also extends through the members 22 and 23. The members 30 and 31 are pivotably connected respectively to the clamping member 28 and the members 26 and 27 by the pins 33 and 32. The handle 34 is adjustably secured to the members 26 and 27 by the bolt 35. The handle 34 is provided with one of the washer members 36 which may be suitably secured to the handle 34 by welding or similar means. Also one of the washer members 36 may be secured to the side member 27 in a similar way. The washer members 36 are provided with a series of serrations 37 which interlock when the washers 36 are assembled adjacent one another with the bolt 35. The washers 36 are each provided with the hole 53 to receive the bolt 35, the washers 36 being further provided with the countersunk recess 54 to facilitate forming the inner converging ends of the serrations 37. A spacer member 38 may be interposed between the side member 26 and the handle 34 to compensate for the spacing of the two washers 36 on the opposite side of the handle 34.

It is to be noted that by loosening the nut 39 the handle 34 and its adjusting washer 36 may be pivotably moved around the bolt 35 to permit the handle 34 to be located in any desirable position.

The clamping member 28 may be constructed of a flat bar which can be twisted or formed as at 40 to provide a horizontal portion 41 at its end to which may be suitably fastened the clamping block 42 by means of the rivet 43 or similar means. The clamping block 42 may be constructed of rubber, fiber, or other similar material to provide a frictional surface for more efficiently contacting the pressed steel member 7 and to prevent scoring, marring or slipping of the pressed steel member 7.

Figure 2 discloses the clamping device assembly A in its open or disengaged position and it is to be noted that the length of the members 30 and 31 are approximately the same as the vertical distance between the pins 24 and 29, the members 22 and 23 thus extending angularly to operatively connect the members 26 and 27 and the members 22 and 23. When the clamping device assembly A is in this open or disengaged position, the pin 44 is suitably mounted in the clamping member 28 so that it extends through the clamping member 28 and contacts the members 30 and 31 to limit the further opening movement of the clamping device assembly A.

Also the pin member 44 contacts the same side of the members 30 and 31 when the clamping device assembly A is in its clamping or non-clamping positions as disclosed in Figs. 1 and 2.

It is to be noted that as the clamping member 28 moves forward to its fully clamped position as disclosed in Fig. 1, the pin 32 moves to a point just ahead of the vertical or dead center of the pin 33 and in such position the members 30 and 31 contact the pin member 44 thus providing an over dead center position which locks the clamping device assembly A in its fully engaged position so that any movement of the pressed steel member 7 against the clamping block 42 will not disengage or open the clamping device assembly A. Also any upward thrust imposed on the clamping member 28 will not tend to release the clamping device from its locked position of engagement.

The upright flange 21 of the base member 17 is provided with a series of holes 45. By removing the pin 25 and reassembling it in any one of the holes 45, the clamping block 42 and the clamping lever 28 together with its operating mechanism may be pivotally moved around the pin 24 to occupy different positions relative to the die members, as indicated by the dotted lines 55 and 56 which disclose the positions occupied by the end of the clamping member 28 and the clamping member 42 when the pin 25 is reassembled in some of the various holes 45.

Heretofore it has been customary to provide the die member 1 with the supporting surface 14 machined at various angles when the clamping device assembly A is to be used in various angular clamping positions, this necessitating considerable expense as each die block would have to be milled especially for one position of the clamping device assembly A. With my invention a plurality of die members 1 can be provided with a horizontal supporting surface 14 which not only is easier to machine but also affords a standard clamping boss upon which my clamping device assembly A can be utilized in various clamping positions.

Also it is to be noted that the location of the pin 25 in the various holes 45 will provide an adjustment movement of the clamping device assembly in a vertical plane. In order to further provide for the adjustable movement of the clamping device assembly A in a plane approximately at right angles to said vertical plane, I have provided the supporting member 57 provided with the boss 47 and the flange 48, the flange 48 being provided with a surface 49 which can be supported on the surface 14 as above described. The boss 47 extends for approximately one half the width of the flange 48 and the upright flange 50 is attached to the boss 51 which extends for approximately one half the width of the flange 50. The boss 47 is provided with the threaded hole 58 which is engaged by the threaded portion of the screw 52, which extends through the boss 51 of the upright flange 50. The upright flange 50 is provided with a series of holes 45 into which may be fitted the pin 25, which will enable the clamping device assembly A to be adjustably and pivotally moved about the axis of the pin 24 which engages the hole 61, the bolt 52 providing further adjusting movement in an angle at right angles to the plane of movement provided with the pin 25 and the holes 45, the bolt 52 being used to clamp the upright flange 50 and its boss 51 in any desired position relative to the boss 47, one of such positions being indicated by the dotted lines at 64, Fig. 6. Also to further provide for positive securement of the upright flange 50 in its adjusted positions, the engaging ends of the bosses 47 and 51 may be provided with the converging serrations 59 and 60 as disclosed in Fig. 5, the serrations 59 and 60 being similar to the serrations 37 of the washers 36.

It is thus to be noted that my clamping device assembly A is provided with means for adjusting the handle member 34 to various angular positions together with means for adjusting the clamping device assembly A, by means of the pin 25, in the variously located holes 45, together with the further means of swivelly moving the flange 50 and its boss 51, providing a most economical unit because the clamping assembly A as thus disclosed by my invention can be used practically universally on any type of die members provided with an ordinary supporting surface therefrom.

It is to be noted that the handle 34 will travel through an angle of approximately ninety degrees while moving from the open or disengaged position of the clamping device assembly A, as disclosed in Fig. 2 to its closed or fully engaged position, as disclosed in Fig. 1, while the clamping member 28 will have moved through an angle of approximately one hundred and eighty degrees, thus providing a very efficient and power leverage mechanism for clamping purposes. Also the adjustable mounting of the clamping and leverage mechanism on the adjustably mounted base mechanism will provide a clamping device assembly which will be readily adaptable to practically any desired clamping position.

It is also to be noted that the flange 48 of the supporting member 57 which is fixedly secured to the supporting surface 14, will be provided with the open portion 59 which will provide a clearance space for the boss 51, and if desired the sides 60 of the open portion 59 may be inclined to fit relatively close to the boss 51 to preserve a smooth and regular appearance of the coacting portions of the base assembly.

It is also to be noted that the holes 45, which are located radially relative to the pin 24, and its associated hole 61, will provide an indexing means for adjustably moving the clamping and leverage mechanisms to various operating positions while the screw 52 will provide means for clamping the flange 50 and the adjustably mounted clamping and leverage mechanisms thereon to variously selected angular positions in a plane extending at an angle with the plane of adjusting movement of said indexing means. Whereas I have disclosed and described my clamping device assembly as being especially adaptable for use with die members, I do not restrict or limit its use to such installations as my invention can be readily adapted for use in various installations requiring a clamping device mechanism.

I claim:

1. In a clamping device, the combination of a supporting member, a second supporting member, arm members secured to said second supporting member, clamping mechanism supported on said second supporting member and said arm members, means permitting adjustment of said clamping mechanism radially about a center, and means for securing said first mentioned member and said second mentioned member together, said means permitting said clamping mechanism to be adjusted in a plane extending at an angle relative to the plane of the movement of said first mentioned means for adjusting said clamping mechanism.

2. In a clamping device, the combination of a clamping mechanism, a base member provided with a series of holes located on an arc relative to a pivot hole in said base member, a pair of members suitably secured relative to one of the series of holes located on said arc and in the pivot hole relative to which said arc is located, said pair of members being pivotally connected at each of its ends to said clamping mechanism, and pin members for locking said pair of members in said series of holes on said base member.

3. In a clamping device, the combination of a member provided with a supporting flange together with a boss portion extending partially across the supporting flange of said member, said boss portion being provided with a serrated surface, a second member comprising a supporting flange provided with a boss extending for a portion of the width of said supporting flange of said second member, said boss of said second member being provided with a serrated surface for engaging the serrated surface of the boss of said first mentioned member, a pivot member supported in said first mentioned member and pivotally supporting said second mentioned member in various supporting positions, and a clamping mechanism suitably mounted on said second mentioned member.

4. In a clamping device for a die member provided with a supporting surface, the combination of supporting means secured to the supporting surface of the die member, a pair of members each adjustably secured at a plurality of points to said supporting means, a clamping member pivotally supported on said pair of members, and a leverage mechanism for actuating said clamping member, said leverage mechanism being pivotally mounted at one of the plurality of points at which said pair of members are adjustably secured to said supporting means.

5. In a device for clamping an object in die members provided with a supporting boss, the combination of a member having a flange provided with a plurality of openings therein, a second member suitably secured to the supporting boss, means pivotally connecting said first mentioned and said second members, a pair of members suitably supported on said second member and adapted for movement about a center, a locking member for securing said pair of members against movement about its center, said locking member being adapted to engage one of the plurality of openings of said first mentioned member, a clamping member pivotally connected with said pair of members, a second pair of members suitably supported and adapted for movement about said center of said first mentioned pair of members, means pivotally connecting said clamping member and said second pair of members, a handle member adjustably connected with said second pair of members, and means suitably supported on said clamping member for engaging said second mentioned means when the clamping member is in its clamping and non-clamping positions.

6. In a device for clamping an object in a die member, the combination of a supporting member suitably mounted, a supporting means adjustably mounted on said supporting member, a clamping member pivotally connected with said supporting means and cooperating with said die member to clamp the object in said die member, a lever member pivotally connected with said supporting member, linkage means pivotally connecting said clamping member and said lever member, handle means adjustably connected with said lever member, and means suitably mounted in said clamping member and adapted to engage one side only of said linkage means when said clamping member is in either its clamping or non-clamping positions to limit the movement of said clamping member relative to said linkage means.

7. In a device for clamping an object in a die member, the combination of a supporting member suitably mounted on said die member, a second supporting member pivotally mounted on said first mentioned supporting member and adapted to be pivotally moved in a substantially vertical plane about a pivot center extending substantially in a horizontal plane, said second supporting member being further adapted to be clamped in a plurality of positions in said vertical plane relative to said first mentioned supporting member, and means adjustably mounted on said second supporting member to provide a plurality of operative positions, said means including a clamping member adapted to cooperate with a die member to clamp said object in said die member.

8. In a device for clamping an object in a die member, the combination of a member suitably supported and provided with index portions, arm members pivotally connected with said first mentioned member to permit movement of said arm members for adjustment purposes, said arm members being fixed relative to said first mentioned member during the clamping operation, arm members connected with said first mentioned member and said first mentioned arm members, said second mentioned arm members comprising a handle portion pivotally moving about the pivot center of said first mentioned arm members, said last mentioned arm members cooperating with said die member to clamp the object therein, and means engaging said first mentioned arm members and the index portions of said first mentioned member to permit said first and second mentioned arm members together with said handle portion to be located in various positions relative to said first mentioned member.

9. In a device for clamping an object in a die member, the combination of a supporting member suitably mounted and provided with a pivot center portion, a second member pivotally connected with the pivot center portion of said supporting member, said second member being adapted to be moved about the pivot center portion of said supporting member, a clamp member pivotally connected with said second member and adapted to cooperate with said die member to clamp the object in said die member, handle means for operating said clamp member, said handle means being operatively connected with said clamp member and with the pivot center portion of said supporting member, and means for locating said second member together with said clamp member and said handle means in a plurality of positions to provide various clamping positions of said clamp member.

JOHN OLSON.